United States Patent
Huber et al.

(10) Patent No.: US 6,731,078 B2
(45) Date of Patent: May 4, 2004

(54) BALLAST FOR OPERATING ELECTRIC LAMPS

(75) Inventors: Andreas Huber, Traunreut (DE); Martin Niedermaier, Neuotting (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/061,312

(22) Filed: Feb. 4, 2002

(65) Prior Publication Data

US 2002/0109466 A1 Aug. 15, 2002

(30) Foreign Application Priority Data

Feb. 9, 2001 (DE) ......................... 101 06 438

(51) Int. Cl.[7] .............................................. H05B 37/00
(52) U.S. Cl. .................... 315/307; 315/308; 315/224
(58) Field of Search ................................ 315/224, 225, 315/307, 308, 291, 209 R, 247, 246, 362

(56) References Cited

U.S. PATENT DOCUMENTS

| | | | | |
|---|---|---|---|---|
| 5,469,027 A | * | 11/1995 | Uchihashi et al. | 315/224 |
| 5,491,387 A | * | 2/1996 | Saito | 315/307 |
| 5,900,701 A | * | 5/1999 | Guhilot et al. | 315/307 |
| 6,046,551 A | * | 4/2000 | Kita | 315/307 |
| 6,281,642 B1 | * | 8/2001 | Konishi et al. | 315/308 |
| 6,445,137 B1 | * | 9/2002 | Okamoto et al. | 315/246 |
| 6,452,344 B1 | * | 9/2002 | MacAdam et al. | 315/307 |

FOREIGN PATENT DOCUMENTS

EP          0 564 895 B1     10/1993

OTHER PUBLICATIONS

S. W. Amos, R. S. Amos, G. W. A. Dummer, Newnes Dictionary of Electronics 4th, 1999, MPG Books Ltd, pp. 204, 205.*

* cited by examiner

Primary Examiner—Wilson Lee

(57) ABSTRACT

The invention relates to a ballast for operating electric lamps, having an inverter (WR), a DC voltage supply circuit (GLV) for the inverter (WR), a load circuit, connected to the inverter (WR), for supplying voltage to one or more electric lamps (LP), a microcontroller (MC) for monitoring and controlling the operation of the ballast and a voltage supply device (HLV) for the microcontroller (MC). According to the invention, the voltage supply device (HLV) is designed as a DC-DC converter—in particular as a step-down converter—, which ensures a voltage supply to the microcontroller (MC) even in the standby mode of the ballast with the inverter (WR) deactivated. As a result, the power consumption in the standby mode can be reduced to less than 0.5 W.

4 Claims, 2 Drawing Sheets

BALLAST FOR OPERATING ELECTRIC LAMPS

The invention relates to a ballast for operating electric lamps according to the preamble of patent claim 1.

I. TECHNICAL FIELD

The invention relates in particular to a modern electronic ballast for operating electric lamps which has, in addition to an inverter and its control device, also a microcontroller for monitoring and controlling the functions of the ballast and the lamps operated on it. The microcontroller also makes bidirectional communication possible with a central control unit which is arranged outside the ballast and serves for the central closed-loop or open-loop control of a room lighting system, usually comprising a plurality of luminaires and consequently also a plurality of ballasts.

II. PRIOR ART

The European laid-open application EP 0 564 895 A1 describes an electronic ballast for the operation of low-pressure gas-discharge lamps. This ballast has an inverter, a DC voltage supply circuit for the inverter, a load circuit, connected to the inverter, for supplying voltage to an electric lamp, and a device for supplying voltage to the control circuit of the inverter. As already mentioned above, in addition to the control circuit of the inverter, modern electronic ballasts have a microcontroller, which serves for monitoring and controlling the operation of the ballast and the lamps connected to it and makes bidirectional communication possible with a control unit arranged outside the ballast. For these tasks, the microcontroller requires a constant voltage supply, which functions even in what is known as the standby mode of the ballast, that is to say in particular still supplies the microcontroller with electrical energy to an adequate extent when the lamps are switched off and the inverter is deactivated. The device disclosed in the laid-open application EP 0 564 895 A1 for supplying voltage to the control device of the inverter is unsuitable for this purpose.

III. SUMMARY OF THE INVENTION

It is the object of the invention to provide for a generic ballast for the operation of electric lamps an improved voltage supply for the microcontroller which on the one hand reliably supplies the microcontroller with electrical energy, in particular even in the standby mode the ballast, and which on the other hand causes as little power loss as possible.

This object is achieved according to the invention by the features of patent claim 1. Particularly advantageous configurations of the invention are described in the dependent patent claims.

The ballast according to the invention has an inverter, a DC voltage supply circuit for the inverter, a load circuit, connected to the inverter, for supplying voltage to one or more electric lamps, a microcontroller for monitoring and controlling the operation of the ballast or the lamps and a voltage supply device for the microcontroller. According to the invention, the voltage supply device of the microcontroller is designed as a DC-DC converter, the voltage input of which is connected to the voltage output of the DC voltage supply circuit of the inverter and the voltage output of which is connected to the supply voltage input of the microcontroller. The DC-DC converter makes it possible to generate the supply voltage for the microcontroller directly from the AC line voltage rectified by the DC voltage supply circuit, to be precise independently of the operating state of the inverter and the lamps. What is more, the electrical power consumption of the ballast in the standby mode can be lowered to approximately 0.5 W.

The voltage output of the DC-DC converter is advantageously additionally connected also to the supply voltage input of the control device for the inverter switching means. The components of the DC-DC converter are advantageously dimensioned in such a way that an adequately high voltage for supplying both the microcontroller and the control device of the inverter is available at its voltage output. The DC-DC converter can therefore be additionally used also for supplying voltage to this control device. The DC-DC converter advantageously has a step-down converter or is designed as a step-down converter, because a low-volt DC voltage, as required for operating the microcontroller, can be generated with the aid of a step-down converter in a simple way and with relatively low power loss from the comparatively high output voltage of the DC voltage supply circuit. The voltage output of the step-down converter is advantageously formed by an electrolytic capacitor, in order to be able to make an adequately high supply current, of for example 5 mA, available for the control device of the inverter for a short time period, of for example 200 ms. The switching means of the step-down converter and the closed-loop control device for controlling its switching operations are advantageously designed as an integrated circuit. As a result, a space-saving arrangement of the step-down converter or the device for supplying voltage to the microcontroller is made possible. In particular, the main components of the step-down converter, that is to say the switching means and its closed-loop control device, can be integrated into the open-loop control device of the inverter, designed as an ASIC (Application-Specific Integrated Circuit). In order to be able to set the voltage drop across the voltage output of the step-down converter to the desired value, means for temporarily interrupting the switching operations of the switching means of the step-down converter are provided. These means advantageously comprise a threshold switch, which is arranged in a feedback branch to the closed-loop control device of the step-down converter. With the aid of the threshold switch, the voltage drop across the voltage output of the step-down converter can be monitored in a simple way and the closed-loop control device for the step-down converter can be temporarily deactivated or activated. Particularly well suited as the threshold switch is a Zener diode, by the dimensioning of which, and possibly with the aid of a suitably dimensioned additional voltage divider, the output voltage of the step-down converter can be set to the desired value. The aforementioned feedback branch is advantageously electrically isolated from the source potential by means of an optocoupler, in order to exclude any influence of the constantly changing source potential on the switching operations of the step-down converter switching means. In order to avoid radio interference by the step-down converter, the step-down converter is advantageously equipped with radio-interference suppression means. A small-signal diode and a resistor are advantageously used as radio-interference suppression means, the anode of the diode being connected to the step-down converter inductor and its cathode being connected to the positive terminal of the DC voltage output of the step-down converter, and the resistor being arranged in such a way that one terminal is connected to the anode of the small-signal diode and the step-down converter inductor and the other terminal is connected to the frame potential.

The small-signal diode, which has only a very low barrier-layer capacitance, has the effect of blocking the step-down converter inductor at the end of its discharge operation and the resistor damps the still remaining natural oscillation of the circuit, which occurs with every transition of the step-down converter diode from the conducting state to the blocking state.

IV. DESCRIPTION OF THE PREFERRED EXEMPLARY EMBODIMENTS

The invention is explained in more detail below on the basis of a preferred exemplary embodiment. In the drawing.

Figure 1:
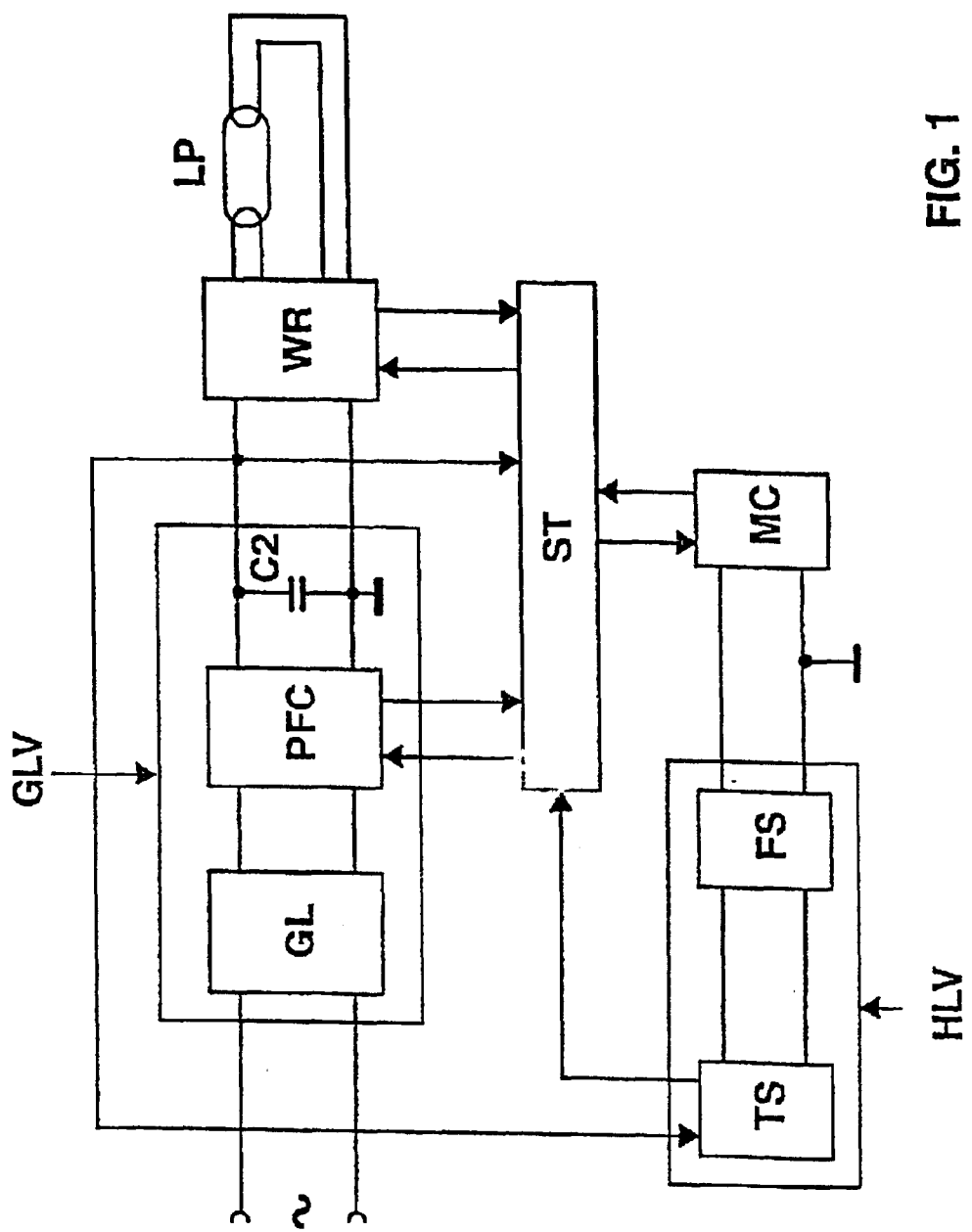
FIG. 1 shows a block diagram of the ballast according to the invention

In FIG. 1, a preferred exemplary embodiment of the invention is represented schematically, in the form of a block diagram. The main component part of this ballast is an inverter WR, in particular a half-bridge inverter, for operating at least one low-pressure gas-discharge lamp LP, in particular a fluorescent lamp. The half-bridge inverter WR is fed by the DC voltage supply circuit GLV, which generates a DC voltage of approximately 400 V to 450 V from the AC line voltage. The DC voltage supply circuit GLV has for this purpose a module GL, which is connected to the line voltage terminals and comprises a radio-interference suppression filter and a downstream bridge rectifier GL, and has a step-up converter PFC connected to the DC voltage output of the module GL. The step-up converter PFC serves for power factor correction and makes an approximately sinusoidal line current drain possible. The voltage output of the step-up converter or of the DC voltage supply circuit GLV is formed by the intermediate-circuit capacitor C2. The supply voltage for the inverter WR is provided at the intermediate-circuit capacitor C2 formed as an electrolytic capacitor. The open-loop control device ST essentially comprises driver circuits for driving the switching transistors of the half-bridge inverter WR and the step-up converter PFC. It is usually designed as an Application-Specific Integrated Circuit, known as an ASIC. In addition, the ballast has a microcontroller MC, which generates control signals for the driver circuits of the open-loop control device ST for driving the switching transistors of the inverter WR and the step-up converter PFC and serves for monitoring the operating states of the step-up converter PFC, the inverter WR and the at least one lamp LP. The microcontroller MC is also able to be connected via interfaces (not depicted) to a central control unit (not depicted), which is arranged outside the ballast and serves for the central control of the functions of the complete lighting system, of which the ballast according to the invention represents one component. Via these interfaces, the microcontroller or the ballast receives control commands from the central control unit for switching on/off and for regulating the brightness of the at least one lamp LP. What is more, information on the operating states of the ballast or of the at least one lamp LP is passed on via these interfaces to the central control unit. Serving for supplying voltage to the microcontroller MC is the voltage supply device HLV, formed as a DC-DC converter. The voltage input of the DC-DC converter HLV is connected to the intermediate-circuit capacitor C2 or to the voltage output of the DC voltage supply circuit GLV. A first voltage output of the DC-DC converter HLV is connected to the supply voltage input of the microcontroller MC and a second voltage output of the DC-DC converter HLV is connected to the supply voltage input of the open-loop control device ST. The DC-DC converter HLV generates from the DC voltage provided at the intermediate-circuit capacitor C2 a DC voltage of approximately 5 V for the microcontroller MC and a DC voltage of at least 12 V for the voltage supply to the open-loop control device ST. The DC-DC converter HLV includes for this purpose a step-down converter TS and a downstream fixed-voltage regulator FS, which regulates the output voltage of the step-down converter TS to a value of approximately 5 V for the microcontroller MC. The DC-DC converter HLV supplies the microcontroller MC with electrical energy, independently of the operating states of the inverter WR and the step-up converter PFC. Even in the standby mode of the ballast, when the inverter WR and the step-up converter PFC are deactivated, the DC-DC converter HLV generates a supply voltage of approximately 5 V for the microcontroller MC. In this case, the AC line voltage, rectified by the module GL, lies across the intermediate-circuit capacitor C2 as the input voltage for the DC-DC converter HLV.

Figure 2:
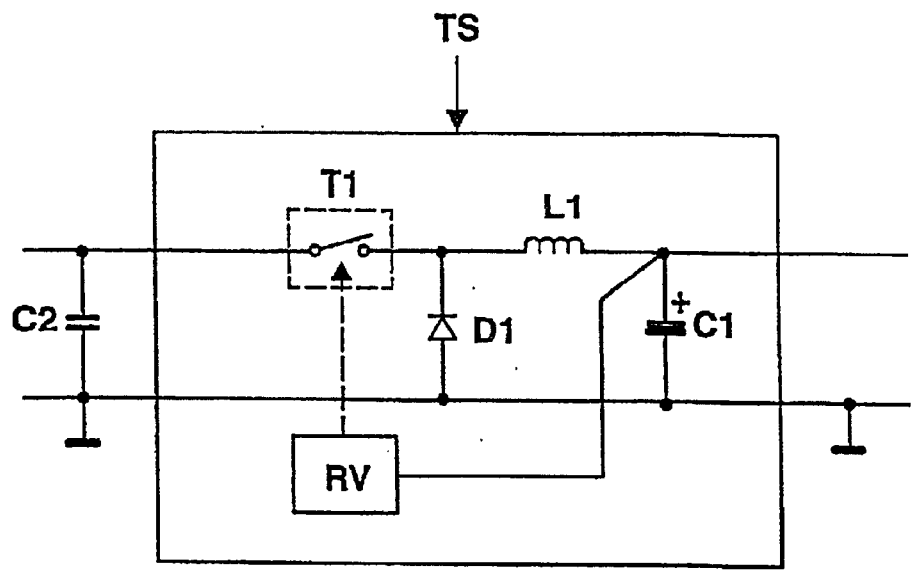
FIG. 2 shows a schematic representation of the step-down converter of the ballast depicted in figure

Schematically represented in FIG. 2 is the step-down converter TS of the DC-DC converter HLV. The voltage input of the step-down converter TS is connected to the intermediate-circuit capacitor C2. The voltage drop across the capacitor C2 therefore serves as the input voltage for the step-down converter TS. The step-down converter TS has the switching means T1, the closed-loop control device RV for controlling the switching operations of the switching means T1, the step-down converter inductor L1, the diode D1 and the electrolytic capacitor C1. The electrolytic capacitor C1 forms the voltage output of the step-down converter TS. The closed-loop control device is connected via a feedback branch to the capacitor C1, in order to monitor the voltage drop across the capacitor C1 and, in dependence on this, control the switching operations of the switching means T1. While the switch T1 is switched on, the capacitor C1 is charged via the inductor L1 from the rectified AC line voltage, available at the capacitor C2. In the inductor L1, a magnetic field builds up at the same time. The diode D1 is in the blocking state. During the blocking phase of the switch T1, the energy stored in the magnetic field of the inductor L1 is depleted and given off to the capacitor C1. The capacitor C1 is in this case recharged by means of the inductor L1. The diode D1 is in the conducting state during this time. The supply voltage available at the electrolytic capacitor C1 for the fixed-voltage regulator FS and for the open-loop control device ST depends on the switching cycle of the switching means T1.

Figure 3:
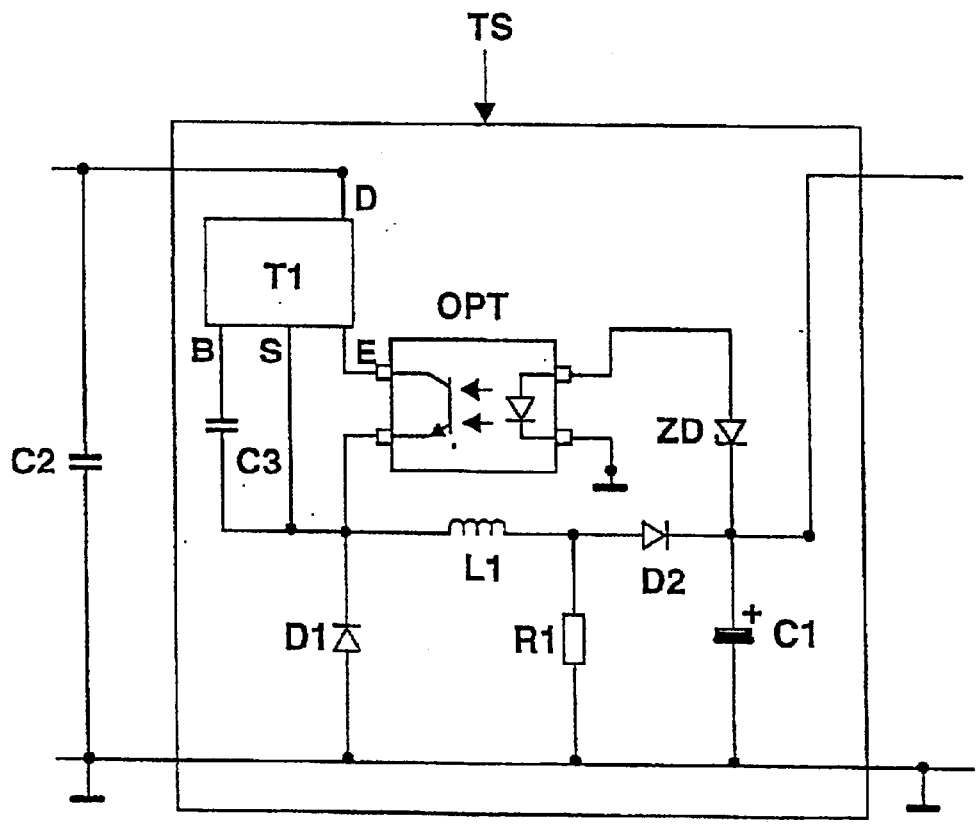
FIG. 3 shows details of the step-down converter of the ballast depicted in FIG. 1.

Details of the step-down converter TS of the DC-DC converter HLV are depicted in FIG. 3. The switching regulator, designed as an integrated circuit and commercially known by the designation TNY 253, is used as the switching means T1. The closed-loop control device RV is integrated in the switching regulator T1. The drain terminal D of the switching regulator T1 is connected to the positive terminal of the capacitor C2. The source terminal S of the switching regulator T1 is connected via the step-down converter inductor L1 and the forward-biased diode D2 to the positive terminal of the electrolytic capacitor C1. What is more, the source terminal S is connected to the cathode of the diode D1, the anode of which is connected to the internal frame potential of the circuit. Connected to the enable terminal E of the switching regulator T1 is the feedback branch to the capacitor C1. The feedback branch includes the reverse-biased Zener diode ZD and the optocoupler OPT.

Connected to the bypass terminal B of the switching regulator T1 is the capacitor C3, which serves for stabilizing the supply voltage of the switching regulator T1 with respect to the source voltage. What is more, the step-down converter TS has the resistor R1, which together with the diode D2 serves for the radio interference suppression of the step-down converter TS. One terminal of the resistor R1 is connected to the anode of the diode D2 and to the inductor L1, while the other terminal of the resistor R2 is connected to the frame potential.

The switching regulator T1 depicted in FIG. 3 includes an oscillator, which continually switches the switching means present in the switching regulator T1 on and off in a predetermined switching cycle. As a result, the connection between the drain D and the source S of the switching regulator T1 is continually interrupted and established, in a way similar to the switching operations of a field-effect transistor. With an electrically conducting drain-source path of the switching regulator T1, the capacitor C1 is charged via the inductor L1 and the forward-biased small-signal diode D2 from the supply voltage available at the capacitor C2. During this time, a magnetic field builds up in the inductor L1 and the diode D1 is blocked. During the blocking phase of the drain-source path of the switching regulator T1, the electrical energy stored in the magnetic field of the inductor L1 is depleted and used for recharging the capacitor C1. The charging current for the capacitor C1 flows in this case via the diode D1. The voltage available at the capacitor C1 for the voltage supply to the open-loop control device ST and the microcontroller MC is determined by the switching cycle of the switching regulator T1. With the aid of the feedback branch already mentioned above, the switching cycle of the switching regulator T1, and consequently the voltage drop across the capacitor C1, are controlled. If the voltage drop across the capacitor C1 reaches the threshold voltage of the Zener diode ZD, the latter becomes conductive and the light-emitting diode of the optocoupler begins to light up. As a result, the enable terminal E of the switching regulator T1 receives an input signal, which deactivates the closed-loop control device for the switching operations of the switching means of the switching regulator T1. The drain-source connection therefore remains interrupted as long as the input signal is present at the enable terminal E and the capacitor C1 is therefore no longer recharged. As soon as the voltage drop across the capacitor C1 falls again below the threshold voltage of the Zener diode ZD, the Zener diode ZD goes into the blocking state and the input signal at the enable terminal E of the switching regulator T1 disappears. The closed-loop control device in the switching regulator T1 for controlling its switching means is reactivated as a result and the switching operations of the switching means are resumed. In a corresponding way, the capacitor C1 is also recharged again. By setting the threshold voltage of the Zener diode ZD to a suitable level, the output voltage across the capacitor C1 of the step-down converter TS can be set to the desired value. To be able to supply both the open-loop control device ST and the microcontroller MC adequately with electrical energy, a voltage of approximately 28 V is generated at the capacitor C1. With the aid of the downstream fixed-voltage regulator FS, a supply voltage of 5 V is generated from this for the microcontroller MC and, with the aid of a two-position controller or a voltage divider, a supply voltage of approximately 12 V is generated for the open-loop control device ST.

As already mentioned above, the components D2 and R1 serve for the radio interference suppression of the step-down converter TS. On account of the inductance of the inductor L1 and the capacitance of the capacitor C1 and also the barrier-layer capacitance of the diode D1, without the components R1, D2 a natural oscillation leading to radio interference forms at the transition of the diode D1 from the conducting state to the blocking state. The small-signal diode D2 is blocked at the end of the discharge operation of the inductor L1, that is to say after the energy stored in the magnetic field of the inductor L1 has been depleted. This prevents a transmission back of the electrical energy stored in the electrical field of the capacitor C1 to the inductor L1. The resistor R1 damps the residual natural oscillation still remaining.

The invention is not restricted to the exemplary embodiment explained in more detail above. For example, the supply voltage for the voltage transformer HLV may also be obtained directly from the rectified AC line voltage at the DC voltage output of the rectifier GL. It is not necessary to use the output voltage of the step-up converter PFC. What is more, the DC-DC converter may also be used exclusively for the voltage supply to the microcontroller MC. In this case, the supply voltage for the microcontroller MC can also be provided without the fixed-voltage regulator FS, directly at the capacitor C1, that is to say at the voltage output of the step-down converter TS. Furthermore, some other suitable DC-DC converter may be used instead of the step-down converter TS.

What is claimed is:

1. A ballast for operating electric lamps, having
   an inverter (WR),
   a DC voltage supply circuit (GLV) for the inverter (WR), the DC voltage supply circuit (GLV) having a voltage output,
   a load circuit, connected to the inverter (WR), for supplying voltage to one or more electric lamps (LP),
   a microcontroller (MC) for monitoring and controlling the operation of the ballast, the microcontroller (MC) having a supply voltage input,
   a voltage supply device (HLV) for the microcontroller (MC), characterized in that the voltage supply device (HLV) for the microcontroller (MC) is designed as a DC-DC converter, the voltage supply device (HLV) having a voltage input that is connected to the voltage output of the DC voltage supply circuit (GLV), and a voltage output that is connected to the supply voltage input of the microcontroller (MC), wherein:
   (i) the voltage supply device (HLV) for the microcontroller (MC) is distinct from the DC voltage supply circuit (GLV) for the inverter (WR), and
   (ii) the DC-DC converter has a step-down converter (TS), the step-down converter (TS) having a switching means (T1), a voltage output, a closed-loop control device (RV), and a means (OPT, ZD) for temporarily interrupting the switching operations of the switching means (T1) of the step-down converter (TS), wherein the means for temporarily interrupting the switching operations of the switching means of the step-down converter comprises a threshold switch (ZD), which is arranged in a feedback branch to the closed-loop control device (RV) and serves for monitoring the voltage at the voltage output of the step-down converter (TS).

2. A ballast for operating electric lamps, having
   an inverter (WR),
   a DC voltage supply circuit (GLV) for the inverter (WR), the DC voltage supply sircuit (GLV) having a voltage output, a load circuit, connected to the inverter (WR), for supplying voltage to one or more electric lamps (LP), a microcontroller (MC) for monitoring and controlling the operation of the ballast, the microcontroller (MC) haivng a supply voltage input, a voltage supply device (HLV) for the microcontroller (MC), characterized in that the voltage supply device (HLV) for the microcontroller (MC) is designed as a DC-DC converter, the voltage supply device (HLV) having a voltage input that is connected to the voltage output of the DC voltage supply circuit (GLV), and a voltage output that is connected to the supply voltage input of the microcontroller (MC), wherein:

(i) the voltage supply device (HLV) for the microcontroller (MC) is distinct from the DC voltage supply circuit (GLV) for the inverter (WR), and (ii) the DC-DC converter has a step-down converter (TS), the step-down converter (TS) having a voltage output and radio-interference suppression means (R1, D2).

3. A ballast for operating electric lamps, having an inverter (WR), a DC voltage supply circuit (GLV) for the inverter (WR), the DC voltage supply circuit (GLV) having a voltage output, a load circuit, connected to the inverter (WR), for supplying voltage to one or more electric lamps (LP), a microcontroller (MC) for monitoring and controlling the operation of the ballast, the microcontroller (MC) having a supply voltage input, a voltage supply device (HLV) for the microcontroller (MC), characterized in that the voltage supply device (HLV) for the microcontroller (MC) is designed as a DC-DC converter, the voltage supply device (HLV) having a voltage input that is connected to the voltage ouput of the DC voltage supply circuit (GLV), and a voltage output that is connected to the supply voltage input of the microcontroller (MC), wherein:

(i) the voltage supply device (HLV) for the microcontroller (MC) is distinct from the DC voltage supply circuit (GLV) for the inverter (WR), (ii) the DC-DC converter has a step-down converter (TS), the step-down converter (TS) having a voltage output, and (iii) the voltage output of the step-down converter (TS) is formed by an electrolytic capacitor (C1).

4. A ballast for operating electric lamps, having;

an inverter (WR), a DC voltage supply circuit (GLV) for the inverter (WR), the DC voltage supply circuit (GLV) having a voltage output, a load circuit, connected to the inverter (WR), for supplying voltage to one or more electric lamps (LP), a microcontroller (MC) for monitoring and controlling the operation of the ballast, the microcontroller (MC) having a supply voltage input, a voltage supply device (HLV) for the microcontroller (MC), characterized in that the voltage supply device (HLV) for the microcontroller (MC) is designed as a DC-DC converter, the voltage supply device (HLV) having a voltage input that is connected to the voltage output of the DC voltage supply circuit (GLV), and a voltage output that is connected to the supply voltage input of the microcontroller (MC), wherein:

(i) the voltage supply device (HLV) for the microcontroller (MC) is distinct from the DC voltage supply circuit (GLV) for the inverter (WR), and (ii) the voltage output of the DC-DC converter is connected to a supply voltage input of an open-loop control device (ST) for the inverter.

* * * * *